June 10, 1930.  M. S. McCONOUGHEY  1,763,315
MACHINE FOR THE MANUFACTURE OF INLAID LINOLEUM
Filed Dec. 1, 1927  3 Sheets-Sheet 1

June 10, 1930.  M. S. McCONOUGHEY  1,763,315
MACHINE FOR THE MANUFACTURE OF INLAID LINOLEUM
Filed Dec. 1, 1927   3 Sheets-Sheet 2

INVENTOR
Merle S. McConoughey
BY Gordon C. Willard
ATTORNEY

June 10, 1930.  M. S. McCONOUGHEY  1,763,315
MACHINE FOR THE MANUFACTURE OF INLAID LINOLEUM
Filed Dec. 1, 1927  3 Sheets-Sheet INVENTOR
Merle S. McConoughey
BY Gordon C. Willard
ATTORNEY Patented June 10, 1930

1,763,315

UNITED STATES PATENT OFFICE

MERLE S. McCONOUGHEY, OF EAST ORANGE, NEW JERSEY, ASSIGNOR TO CONGOLEUM-NAIRN, INC., A CORPORATION OF NEW YORK

MACHINE FOR THE MANUFACTURE OF INLAID LINOLEUM

Application filed December 1, 1927. Serial No. 236,892.

The present invention relates to the manufacture of continuous sheets of plastic material, and more particularly to the manufacture of continuous sheets of linoleum composition or the like, in which variously colored linoleum composition is combined or inlaid to produce a variegated appearance simulating natural marble.

In my co-pending application, Serial No. 200,614, filed June 22nd, 1927, I have described and claimed a novel process for the production of continuous sheets of marbleized linoleum or other plastic material, which process comprises broadly, forming individual primary sheets from vari-colored plastic composition, folding the sheets, piling the folded sheets in overlapping relation, and cross-rolling the formed pile to produce a single continuous variegated sheet.

The principal object of the present invention is the provision of a full automatic machine adapted to produce a continuous sheet, of uniform width, of inlaid linoleum or similar plastic material having the desired decoration, simulating natural marble, thereby avoiding irregularities, characteristic in products subject to manual operations and accelerating the production of the finished product. Other objects and features of my invention will be more fully understood from the following description in connection with the accompanying drawing in which.

Figure 1:
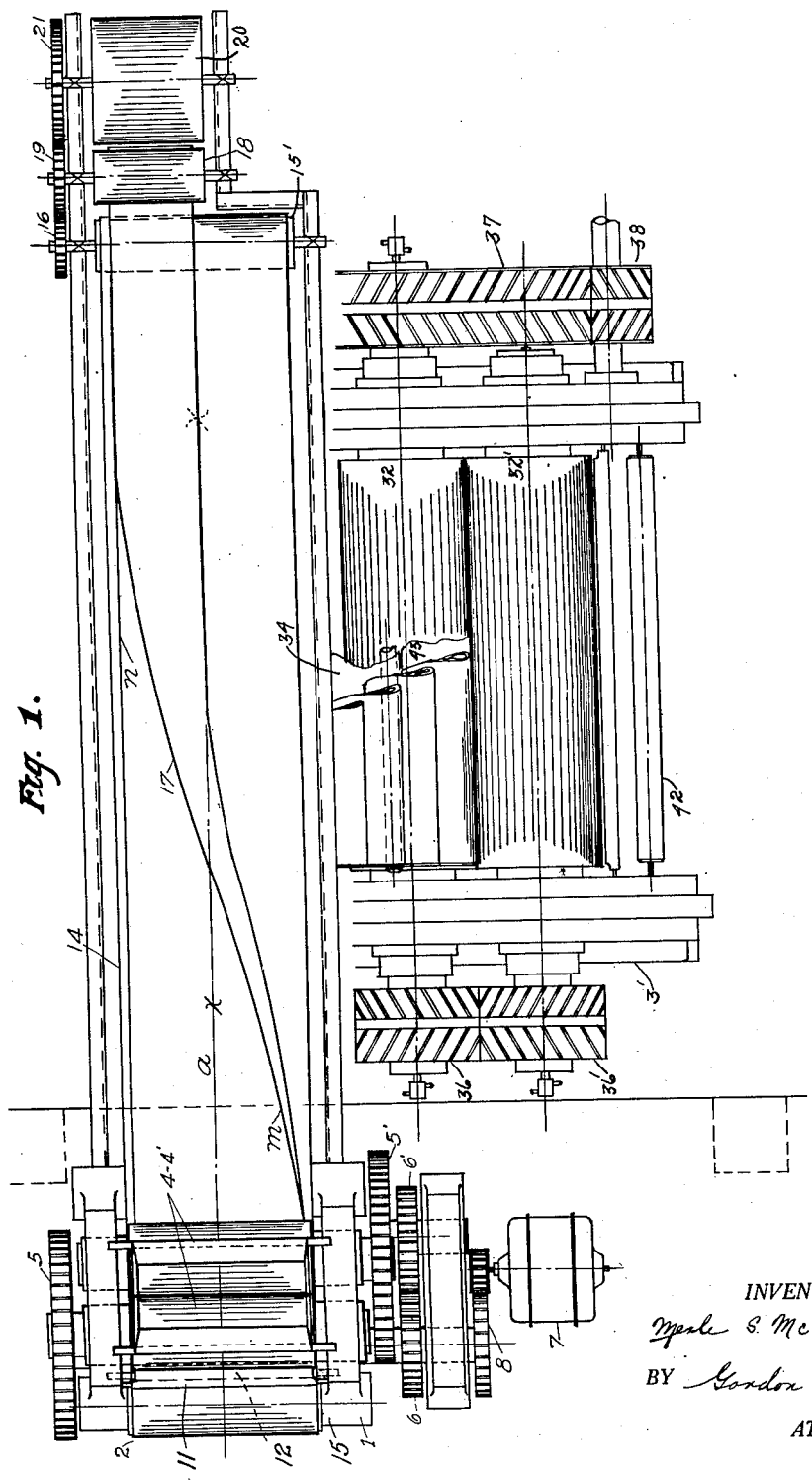
Figure 1 is a plan view of a machine for forming continuous sheets of marbleized linoleum, constructed in accordance with the principles of my invention.
Figure 2:
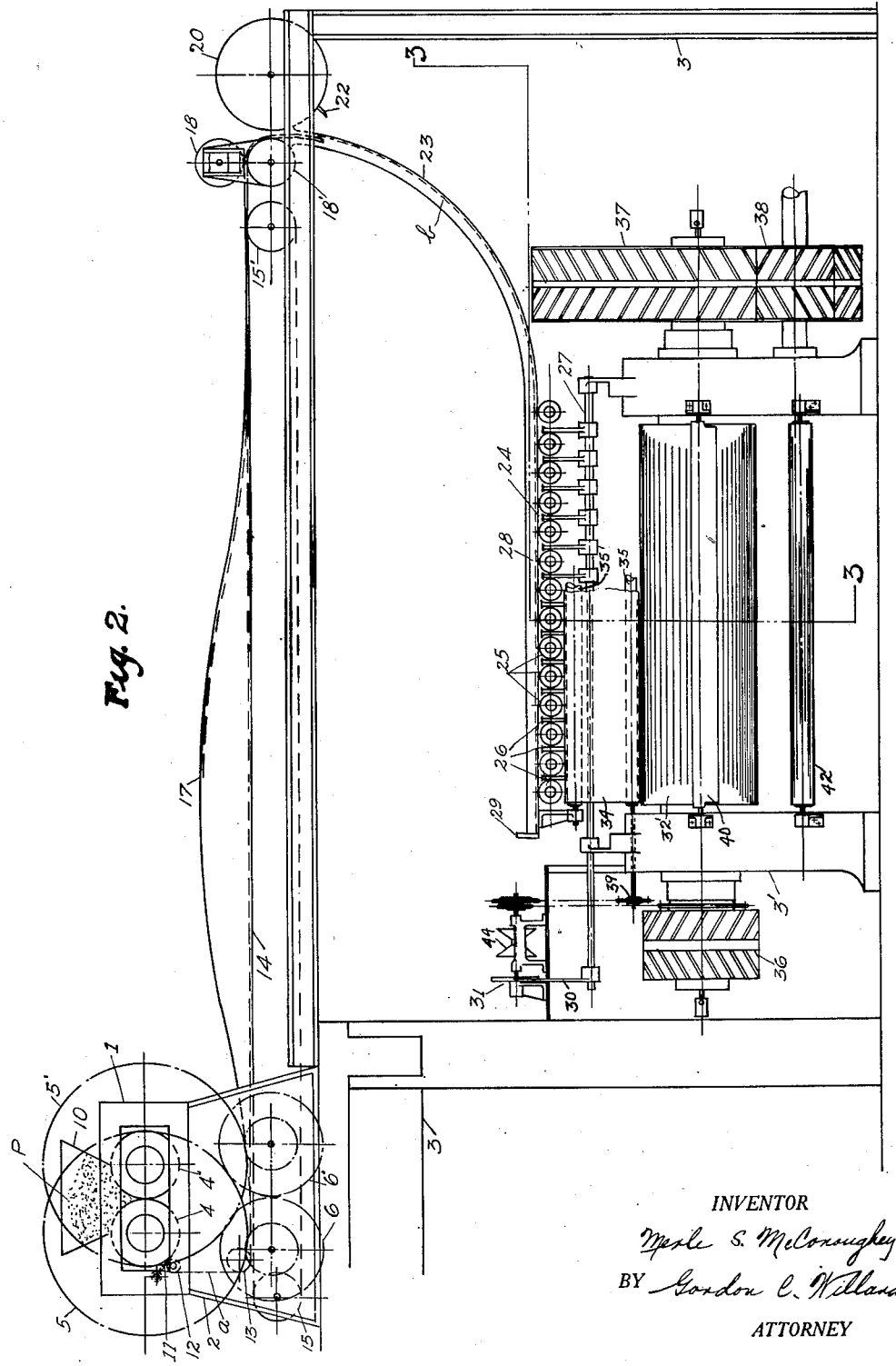
Figure 2 is an elevation of the machine shown in Figure 1.

Referring to the accompanying drawings, the numeral 1 designates the frame of a primary calendering apparatus 2, which is mounted upon a suitable foundation 3. Journalled in bearings carried by the frame 1 is a pair of sheeting rolls 4, 4', adapted to be rotated by means of the driving gears 5, 5', and intermeshing gears 6, 6', one of which is driven by the motor 7 through the gear train 8. Positioned above the rolls 4, 4', and in gravity feed relation thereto, is a hopper 10 adapted to receive the linoleum or other plastic composition. Adjacent the sheet carrying roll 4 is a doctor blade 11 for stripping the formed sheet of plastic material from the roll and directing it downwardly over the supporting rollers 12 and 13.

Extending beneath the primary calendering apparatus 2 and in receiving relation thereto is a belt conveyor 14, carried by the rollers 15, 15' which are suitably journalled in the framework 3. Integral with one roller 15 is a driving gear 16. Mounted over the conveyor belt 14 and adjacent thereto, is a curved guide member 17, which is supported by the framework 3 and adapted to cause the sheet of plastic composition which is formed by the sheet carrying rolls 4, 4', to be folded longitudinally, as hereinafter more fully explained. At the end of the guide member 17 and opposite the primary calendering apparatus 2, is a pair of drawing rolls 18, 18', operable through a gear which intermeshes with the gear 16.

Adjacent the lower member of the pair of rolls 18, 18', is a cutter drum 20 driven through the gear 21 intermeshing with gear 19. Upon the periphery of the drum 20 and parallel to the axis thereof, is a knife 22 adapted to contact with the roll 18 as the drum revolves, to sever a continuous sheet of plastic material formed in the primary calendering apparatus, into a plurality of individual sheets. Directly beneath the bite formed by the roll 18 and cutter drum 20, is a downwardly directed chute 23 adapted to receive and convey the individual sheets, periodically severed by the knife 22, to a supporting table or platform 24. The platform 24 is preferably constructed of a plurality of parallel rollers 25, designed to rotate freely in their bearings, and is provided with a stop 29 for uniformly positioning the sheets thereon. Intermediate the rollers 25 are a plurality of curved arms 26, the upper faces of which are in a plane slightly below the plane defined by such rollers. The arms 26 are rigidly attached to the shaft 27 and form as a unit therewith, a tipping table 28. Attached to the shaft 27 is a lever arm 30 adapted to be reciprocated by the conventional type of cam and cam follower mechanism 31, whereby the shaft 27 is caused to oscillate and the tipping table is raised periodically from the position $y$ to the position $z$. The cam mechanism 31 is operated in synchronism with the cutter drum 20, whereby the tipping table is always in position $y$ when the knife 22 revolves into a cutting position.

Parallel with the tipping table 28 and at right angles with the sheeting rolls 4, 4' of the primary calendering apparatus 2, is a second pair of calendering or sheeting rolls, 32, 32', journalled in bearings carried by the framework 3'. The rolls 32, 32' are provided with axial passages 33, 33'. Cold water is passed through one passage 33', in order to maintain a small temperature differential between the two rolls, so that the plastic sheet, because of its greater tendency to adhere to the cooler surface, will always follow and be carried by the water cooled roll. Intermediate the tipping table 28 and the sheeting rolls 32, 32', is a conveyor belt 34, carried by the rollers 35, 35', and adapted to receive the individual sheets as they are deposited by the tipping table 28 and to continuously convey the same to the second pair of rolls. Extending over the warmer sheeting roll 32 from a point adjacent the nip of the rolls to the belt conveyor 34, is an apron 43 over which the individual sheets are guided to the bite of the rolls, as hereinafter more fully explained. The sheeting rolls 32, 32' are rotated by means of the intermeshing gears 36, 36', driving gear 37, pinion 38, and motor (not shown). Interconnected with the driving gear 37 by any conventional means, the gear 39 integral with the roller 35, supporting the conveyor 34, is adapted to cause the latter to move in synchronism with the sheeting rolls 32, 32'. Adjacent the cooler or the sheet carrying roll 32', is a doctor blade 40, which is adapted to strip the finished sheet from the sheeting rolls and to direct it over the rollers 41, 42, from which it may be conducted to any desired subsequent operation.

Describing now in detail the operation of my novel inlaying machine:

The hopper 10 is continuously fed with vari-colored plastic linoleum composition $p$, preferably in the form of lumps or "sausages." The lumps or "sausages" are preferably of substantially uniform color, the variegations being due to employing a mixture of two or more kinds of different colored lumps. The mixture may comprise particles of any shape down to average pea size or larger, but without much of any granular or finely divided material, such as is not adapted for the production of marbelized pattern. In a typical case, lumps or "sausages" have been used as small as $1/4''$ in diameter, but $3/16''$ to $1/2''$ diameter and $1/2''$ up to say $3''$ in length are preferable.

The lump mixture from the hopper 10 is drawn through the pair of sheeting rolls 4, 4', which serve to elongate, flatten, and consolidate the lumps to form a continuous sheet $a$, with corresponding elongated variegations due to the different color and size of the lumps. The elongated sheet thus formed, is removed from the roll 4 by the doctor blade 11, passes over the rollers 12 and 13 to the conveyor belt 14, and through the rollers 18, 18'. As the sheet $a$ supported by the conveyor belt 14 is drawn along by the rolls 18, 18', driven by the gear 19, the side $m$ of the sheet, following the contour of the curved guide member 17, is raised, folded over, and brought into association with the side $n$ thereof. The sheet $a$ thus folded, approximately along the center line $x$—$x$, passes between the drawing rolls 18, 18' and the cutter drum 20, and into the downwardly directed chute 23. The gears 16 and 19, operating the conveyor belt 14 and the drawing rolls 18 respectively, are interconnected and operate in synchronism with the sheeting rolls 4, 4', whereby the sheet $a$ is continuously formed and folded in the manner described.

As the continuous folded sheet $a$ passes over the roll 18 and between it and the cutter drum 20, it is periodically severed by the knife 22 into the individual sheets $b$ of predetermined length. In general, the length of the severed sheet will be predetermined according to the width of the final sheet to be produced, such length being substantially the same or slightly greater than said width. The desired width of the final sheet having been determined, the speed of rotation of the cutter drum with respect to the drawing rolls, will be governed accordingly by establishment of the proper ratio between the gears 19 and 21 or by the employment of any conventional type of variable speed drive (not shown) interconnecting the gears 19 and 21. In a particular case, the width of the sheet $a$, produced by the calendering rolls 4, 4', will be approximately $36''$, foldable to $18''$, while the length of the individual folded sheet $b$, cut off by the knife 22, will be about $76''$, where the width of the ultimate sheet to be produced is $72''$.

The folded sheets $b$, gravity-conveyed through the chute 23, are conducted in succession onto the supporting table 24 and against the stop 29. As a folded sheet, severed by the knife 22, comes into position on the table 24, the lever arm 30 is reciprocated by the conventional type of cam and cam follower mechanism 31, causing the shaft 27 to be rotated and the tipping table 28 to be raised from its normal position $y$ to the position $z$, thereby raising the folded sheet $b$ from the rollers 25 and depositing the same upon the conveyor 34. The sheet being deposited, the tipping table is returned to its position y by the cam and cam follower mechanism 31, for the reception of the succeeding sheet. As pointed out above, the cam mechanism 31 is operated in synchronism with the cutter drum 20, so that the tipping table 28 is always in position y and adapted to receive the severed sheet whenever the knife 22, carried by the cutter drum 20, revolves into a cutting position.

Figure 3:
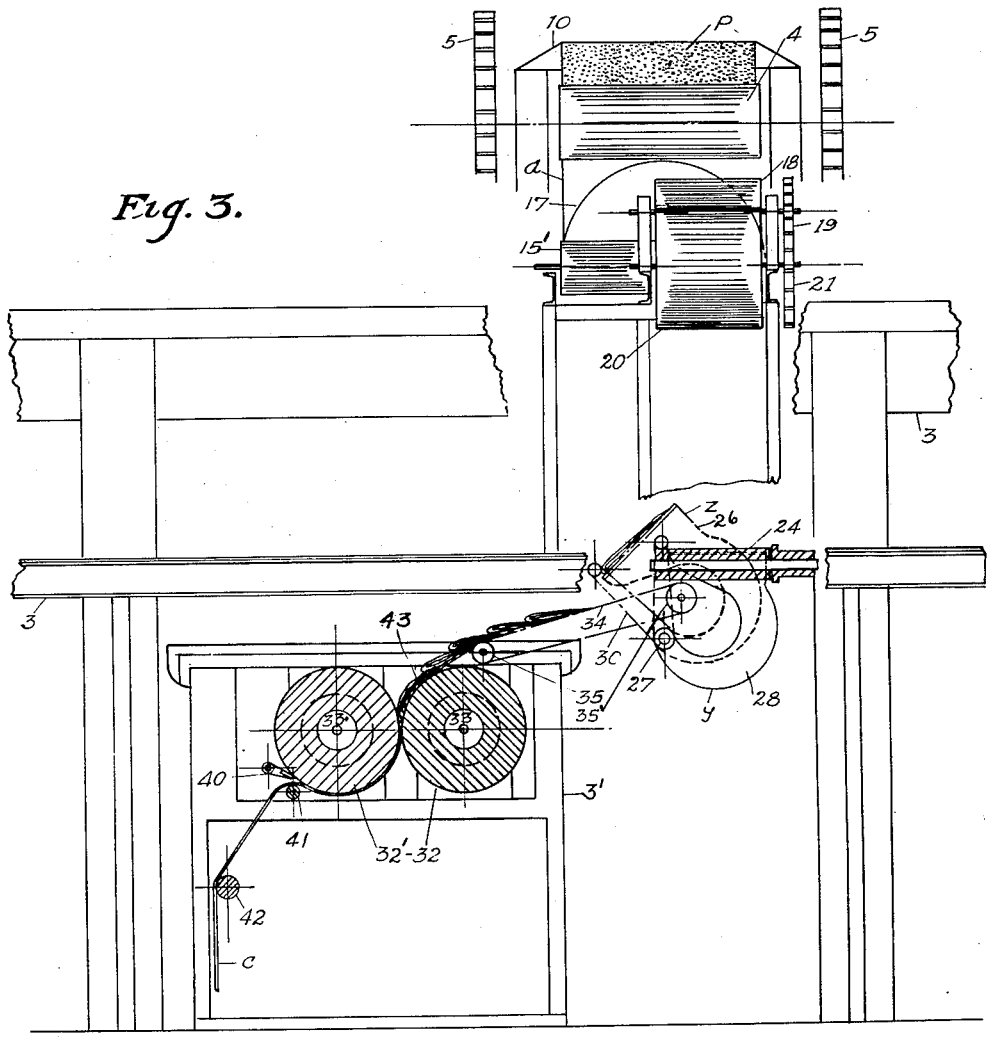
Figure 3 is a sectional elevation taken on the line 3—3 of Figure 2.

According to my invention and as particularly pointed out in my co-pending application above referred to, the individual folded sheets b are introduced to the second pair of calendering rolls in a transversely overlapping relation. To accomplish this end, it is to be particularly noted that the movement of the tipping table 28 about the shaft 27 is such that, not only will the individual folded sheets be regularly positioned upon the conveyor 34, but that the forward portion of each succeeding sheet will overlay the back portion of the preceding sheet, as clearly shown in Figure 3. Another feature of my invention is the positioning of the curved member 17 in such a manner that the folded edge of the sheet b will be first presented to the cross-rolling rolls 32, 32', in order to avoid visible joints or discontinuity in the pattern of the resulting sheet c, as are likely to occur if the free edge of the folded sheets are first presented. As above described, the tipping table 28, which serves to deposit the folded sheets in overlapping relation, is operated in synchronism with the cutter drum 20. Likewise, the conveyor 34, which receives the folded sheets b from the tipping table 28, is operated in synchronism with the rolls, 32, 32', to maintain uniform feed of material thereto. It is obvious, however, that by varying the relative speeds of operation of the tipping table 28 and the conveyor 34, the relation of the successive overlapping sheets will be varied, i. e. the overlap will be greater or less. Obviously, the proper overlapping relation in any case will depend upon numerous factors, as will be familiar to those skilled in the art, but more particularly upon the relative thickness of the primary sheet a and ultimate sheet c, and upon the number of folds. Most satisfactory results are obtained when the thickness of the primary sheet is equal to or slightly greater than the final sheet to be produced, and when the primary sheet thus formed is folded once, approximately along its longitudinal center line. In this case, I have found that the most advantageous operating conditions exist when the relative speed of operation of the tipping table 28 with respect to the operation of the conveyor 34, is such that the table 28 is reciprocated at frequencies to deposit each successive folded sheet with the forward folded edge thereof in approximate registry with the center line of the preceding folded sheet, i. e., so that the thickness of the pile at any point will not be greater than four times the thickness of the primary sheet. In more general terms, it may be stated that the thickness of the pile of overlapped sheets should not be more than four to six times the thickness of the final sheet. In a particular case, for the production of a final sheet of $\frac{3}{32}''$ thickness, I have found that the best results are obtained if the thickness of the primary sheet a is approximately $\frac{1}{8}''$, giving $\frac{1}{4}''$ thickness for the folded sheet b and $\frac{1}{2}''$ thickness for the pile of overlapped sheets. The relative speeds of operation of the tipping table 28 and conveyor 34 may be readily controlled by means of any conventional variable speed drive 44, interconnecting the cam and cam follower mechanism 31 with the driving gear 37.

The folded sheets b, positioned in uniform and correct overlapping relation upon the belt conveyor, are continuously carried thereby toward the second pair of calendering rolls 32, 32'. At a point adjacent the rolls, the overlapped sheets are removed from the conveyor by the lip of the apron 43, and guided over the warmer roll 32, to a point adjacent the bite of the rolls, where they are engaged by the cooler or sheet carrying roll 32'. By this means, the overlapped variegated sheets are introduced to the sheeting rolls without "pulling" or "crowding," thereby preventing the blending or clouding of the several colors, which would be undesirable in a decoration simulating natural marble.

As the individual overlapping sheets b pass through the sheeting rolls 32, 32', they are consolidated in the cross-rolling operation into one continuous sheet c, of uniform width, having the desired decoration simulating natural marble. With a mixture of properly selected consistency and sizes for the lumps or "sausages," the widening by cross-rolling of the pattern in the second pair of rolls 32, 32', may be made approximately the same as the elongation of the primary rolls 4, 4', the widening being capable of variation by proper selection of the size of the pass between the rolls 32, 32', as compared with the number of sheets and the total thickness of the sheets in the overlapped pile supplied to said roll. It is not essential that the widening of the pattern by the cross-rolling operation with the second pair of rolls should be precisely the same as the elongation in the primary rolling, but equality will be found, in most cases, to give the best simulation of natural marble. Throughout the entire inlaying operation, the linoleum composition should preferably be maintained at a temperature not substantially in excess of atmospheric temperature, in order to reduce its plasticity and thereby aid in the production of sharply defined color areas.

The continuous variegated sheet c is stripped from the sheet carrying roll by the doctor blade 40, and is conducted over the rollers 41, 42, to subsequent operations. More particularly, it may be applied in a continuous length to a suitable backing such as burlap, asphalt saturated felt, or the like, in the usual manner of producing linoleum floor coverings, or it may be employed with other sheets similarly variegated, or of solid color, to make block inlaid linoleum in the well-known automatic inlaying machines of the Waldron or Batten type.

It will be obvious to those skilled in the art that numerous variations may be made in the manner of carrying out my invention and in the form and arrangement of the mechanism described. In some cases, as for example, in the production of sheets of plastic composition having other novel decorations, it may be found advantageous to dispense with the curved guide member 17 and to eliminate the step of folding the primary sheets. In such case, the drawing rolls 18, 18′, cutter drum 20, etc., will be adjusted to handle a full width sheet as formed by the sheeting rolls 4, 4′. Such a change and other modifications apparent to those skilled in the art, in view of the description of my novel apparatus herein, are within the scope of my invention, and I do not wish to limit the same, except as defined in the appended claims.

Claims:

1. In a machine for making inlaid linoleum or the like, in combination, a pair of primary sheeting rolls adapted to form a continuous sheet from plastic material, means for continuously folding said sheet, means for severing the continuous folded sheet into individual sheets of predetermined length, a second pair of sheeting rolls, and means for feeding the individual sheets in transversely overlapping relation to said second pair of rolls.

2. In a machine for making inlaid linoleum or the like, in combination, a pair of primary sheeting rolls adapted to form a continuous sheet from plastic material, means for severing said continuous sheet into individual sheets of predetermined length, a second pair of sheeting rolls, and automatic means for feeding the individual sheets in transversely overlapping relation to said second pair of rolls.

3. In a machine for making inlaid linoleum or the like, in combination, a pair of primary sheeting rolls adapted to form a continuous sheet from plastic material, means for continuously folding the said sheet, means for severing said continuous sheet into individual sheets of predetermined length, a second pair of sheeting rolls positioned for cross-rolling the individual sheets, a conveyor for continuously feeding the individual sheets to said second pair of rolls, and means for positioning the individual sheets in transversely overlapping relation upon said conveyor.

4. In a machine for making inlaid linoleum or the like, in combination, a pair of primary sheeting rolls adapted to form a continuous sheet from plastic material, means for continuously folding the said sheet, means for severing said continuous folded sheet into individual sheets of predetermined length, a supporting table for the reception of successive individual sheets, a second pair of sheeting rolls positioned for cross-rolling said individual sheets, a conveyor for continuously feeding said individual sheets to said second pair of sheeting rolls, and a tipping table adapted to remove said individual sheets from said supporting table and to place them in transversely overlapping relation upon said conveyor.

5. In a machine for making inlaid linoleum or the like, in combination, a pair of primary sheeting rolls, means for continuously folding a sheet of plastic material formed thereby, means for severing such continuous folded sheet into individual sheets of predetermined length, a second pair of sheeting rolls disposed in cross-rolling relation to said individual sheets, means for piling the individual sheets in transversely overlapping relation, and means for feeding the pile of overlapped sheets to the second pair of rolls, including an apron extending over one roll to a point adjacent the bite of said rolls.

6. In a machine for making inlaid linoleum or the like, in combination, a pair of primary sheeting rolls adapted to form a continuous sheet from plastic material, means for continuously folding said sheet, means for severing said continuous folded sheet into individual sheets of predetermined length, a second pair of sheeting rolls disposed in cross-rolling relation to the individual sheets, means for piling the individual sheets in transversely overlapping relation, means for feeding the pile of overlapped individual sheets to the second pair of rolls, and means for controlling the overlapping relation of the individual sheets.

7. In a machine for making inlaid linoleum or the like, a primary pair of sheeting rolls adapted to form a continuous sheet from plastic material, a second pair of sheeting rolls disposed at right angles to said first pair, means intermediate the said pairs of rolls for folding and severing said continuous sheet to form individual sheets therefrom, and means for feeding said individual sheets in cross-rolling overlapping relation to said second pair of sheeting rolls.

8. In a machine for making inlaid linoleum or the like, a pair of primary sheeting rolls adapted to form a continuous sheet from plastic material, means for continuously folding said sheet, means for severing said continuous sheet into individual sheets of predetermined length, a second pair of sheeting rolls disposed at right angles to said first pair, a conveyor for continuously feeding the individual sheets to said second pair of rolls, means for positioning the individual sheets in overlapping relation upon said conveyor, and means for controlling the transversely overlapping relation of said sheets.

9. In a machine for making inlaid linoleum or the like, in combination, a pair of primary sheeting rolls, a hopper disposed in gravity feed relation thereto, a sheet folding mechanism comprising a belt conveyor in receiving relation to the primary sheeting rolls, a curved guide member disposed above and adjacent the said belt conveyor, and a pair of drawing rolls; means for periodically severing the continuous sheet of plastic material formed by said primary sheeting rolls, into individual sheets of predetermined length, a supporting table adapted to receive and support the individual sheets, a second pair of sheeting rolls disposed at right angles to said first pair and in receiving relation to said supporting table, a second conveyor adapted to continuously supply plastic sheet material to said second pair of rolls, an apron overlaying one roll of said second pair and adapted to guide the sheet material to the bite of said rolls, a tipping table adapted to periodically remove successive individual sheets from the supporting table and to deposit them in transversely overlapping relation upon said second conveyor, and means for controlling the overlapping relation of the individual sheets.

10. In a machine for making inlaid linoleum or the like, a pair of primary sheeting rolls adapted to form a continuous sheet from plastic material, a second pair of sheeting rolls disposed at right angles to said first pair, means intermediate the said pairs of rolls for severing said continuous sheet to form individual sheets therefrom, and means for feeding said individual sheets in cross-rolling overlapping relation to said second pair of sheeting rolls.

11. In a machine for making inlaid linoleum or the like in combination, a pair of primary sheeting rolls adapted to form a continuous sheet, means for severing said continuous sheet into individual sheets of predetermined length, a second pair of sheeting rolls disposed in cross-rolling relation to the individual sheets, means for feeding said individual sheets in transversely overlapping relation to said second pair of sheeting rolls, and means for controlling the overlapping relation of the individual sheets.

In testimony whereof, I affix my signature.

MERLE S. McCONOUGHEY.